(12) United States Patent
Corti (10) Patent No.: US 11,684,044 B2
(45) Date of Patent: Jun. 27, 2023

(54) FEEDING DISPENSER FOR ANIMAL BREEDING WITH IMPROVED ADJUSTMENT OF THE FEED LEVEL

(71) Applicant: CORTI ZOOTECNICI S.R.L., Monvalle VA (IT)

(72) Inventor: Esterino Corti, Monvalle VA (IT)

(73) Assignee: CORTI ZOOTECNICI S.R.L., Monvalle VA (IT)

( * ) Notice: Subject to any disclaimer, the term of this patent is extended or adjusted under 35 U.S.C. 154(b) by 0 days.

(21) Appl. No.: 17/252,859

(22) PCT Filed: Jun. 19, 2019

(86) PCT No.: PCT/IB2019/055157
§ 371 (c)(1),
(2) Date: Dec. 16, 2020

(87) PCT Pub. No.: WO2019/244067
PCT Pub. Date: Dec. 26, 2019

(65) Prior Publication Data
US 2021/0153481 A1    May 27, 2021

(30) Foreign Application Priority Data
Jun. 20, 2018 (IT) .......................... 102018000006493

(51) Int. Cl.
*A01K 39/012* (2006.01)
(52) U.S. Cl.
CPC ................ *A01K 39/0125* (2013.01)

(58) Field of Classification Search
USPC .......... 119/52.1, 56.2, 56.1, 51.13, 70, 57.4, 119/57.5, 52.2, 52.3, 52.4, 53, 61.1, 119/57.92, 61.2
See application file for complete search history.

(56) References Cited

U.S. PATENT DOCUMENTS

| | | | | |
|---|---|---|---|---|
| 3,388,690 A * | 6/1968 | Hostetler | ........... | A01K 39/0125 119/53 |
| 3,511,215 A * | 5/1970 | Myers | ................ | A01K 39/0125 119/53 |
| 3,811,412 A * | 5/1974 | Murto | ................ | A01K 39/0125 D30/128 |
| 3,911,868 A * | 10/1975 | Brembeck | .......... | A01K 39/0125 119/53 |

(Continued)

FOREIGN PATENT DOCUMENTS

| | | | | |
|---|---|---|---|---|
| DE | 202017004521 | | 11/2017 | |
| DE | 20217004521 U1 * | | 12/2017 | ........... A01K 39/012 |

(Continued)

OTHER PUBLICATIONS

International Search Report issued by the EPO dated Sep. 11, 2019 for lInternational patent applicatrion No. PCT/IB2019/055157.

(Continued)

*Primary Examiner* — Andrea M Valenti
(74) *Attorney, Agent, or Firm* — Silvia Salvadori (57) ABSTRACT

An automatic feeding dispenser with a cylindrical feed supply conduit, an accumulation tray to supply feed to poultry and a shutter having at least one cylindrical portion, outer sliding and rotatable with respect to the supply conduit.

8 Claims, 9 Drawing Sheets

(56) References Cited

U.S. PATENT DOCUMENTS

| | | | | |
|---|---|---|---|---|
| 4,070,990 A | * | 1/1978 | Swartzendruber | A01K 39/0125 119/53 |
| 4,348,988 A | * | 9/1982 | Lawson | A01K 39/0125 222/549 |
| 4,552,095 A | * | 11/1985 | Segalla | A01K 39/0125 119/57.4 |
| 5,007,380 A | * | 4/1991 | Badia | A01K 39/0125 119/57.4 |
| 5,092,274 A | | 3/1992 | Cole et al. | |
| 5,101,765 A | * | 4/1992 | Manfrin | A01K 39/0125 119/53 |
| 5,406,907 A | * | 4/1995 | Hart | A01K 39/0125 119/57.4 |
| 5,957,083 A | * | 9/1999 | Cheng | A01K 39/0125 119/56.2 |
| 6,173,676 B1 | * | 1/2001 | Cole | A01K 39/0125 119/57.4 |
| 6,474,261 B1 | * | 11/2002 | Turner | A01K 39/0125 119/57.4 |
| 6,655,317 B1 | * | 12/2003 | Steudler, Jr. | A01K 39/0125 119/57.4 |
| 6,779,488 B2 | * | 8/2004 | Corti | A01K 39/0125 119/57.4 |
| 7,040,250 B2 | * | 5/2006 | Cole | A01K 39/0125 119/61.31 |
| 7,552,697 B2 | * | 6/2009 | Busse | A01K 39/01 119/57.7 |
| 10,251,373 B2 | * | 4/2019 | Loo | A01K 39/0125 |
| 2001/0047766 A1 | * | 12/2001 | Thuline | A01K 39/0125 119/52.4 |
| 2008/0257270 A1 | * | 10/2008 | Slankard | A01K 39/0125 119/53 |

FOREIGN PATENT DOCUMENTS

| | | | | |
|---|---|---|---|---|
| EP | 1095560 A1 | * | 2/2001 | A01K 39/01 |
| WO | 2016077485 | | 5/2016 | |

OTHER PUBLICATIONS

European Search Report issued by the EPO dated Feb. 26, 2019 for Italian Priority application No. IT201800006493.

* cited by examiner

FEEDING DISPENSER FOR ANIMAL BREEDING WITH IMPROVED ADJUSTMENT OF THE FEED LEVEL

This application is a U.S. national stage of PCT/IB2019/055157 filed on 19 Jun. 2019, which claims priority to and the benefit of Italian Application No. 102018000006493 filed on 20 Jun. 2018 the contents of which are incorporated herein by reference in their entireties.

TECHNICAL FIELD OF THE INVENTION

The present invention concerns a feeding dispenser for animal breeding and, in particular, an automatic feeding dispenser to supply feed for poultry breeding.

PRIOR ART

Automatic feed dispensers are generally connected through appropriate fittings to a main supplying tube inside which the feed is supplied continuously by an auger mechanism. At each point in which a feeding dispenser must be prearranged, the main supplying tube comprises an outlet opening towards the lower part, at the supply conduit of the feed deposited in an accumulation tray. A shutter movable along the supply conduit allows to regulate the feed level inside the accumulation tray. The regulation of the feed level by means of the shutter follows the growth steps of the poultry.

In fact, in the first growth step, the feed accumulation trays must be positioned on the ground and the feed level inside the trays must be maintained high to allow the chicks to feed themselves. As the poultry grow, the feed level inside the accumulation tray is lowered to avoid waste caused by the head movements of the poultry during feed consumption.

Consequently, the automatic feeding dispensers must meet different requirements, often in conflict with each other. For example, the feeding dispensers of this type must have the following characteristics:
  allowing access to the feed during the entire life cycle of the poultry, both in the first days of life (chicks), and at an adult growth stage (for example chickens);
  limiting feed from dispersing outside of the feeding dispenser, not only to avoid waste, but also for the hygienic reasons mentioned in the previous point.

A centralized shutter regulation system, in which cables and appropriate returns are used to contemporaneously move all the shutters of the feeding dispensers connected to a same supplying tube, is often used in known feeding dispensers, especially in those with an accumulation tray of large dimensions. In this case, the regulation occurs periodically and gradually depending on the growth stage of the animals.

In case of small feeding dispensers, in which the access space between the shutter and free edge of the accumulation tray is rather narrow, a similar regulation system can be excessively complex and not very convenient for use. The small feeding dispensers can also be installed in cages and the centralized regulation systems can also be difficult to install and use.

DE202017004521 describes a feeding dispenser in which the shutter regulating the feed level inside the feeding dispenser can be arranged between a plurality of positions by means of a protuberance slidingly engaged in a groove appropriately shaped with several bearing seats at different heights. The regulation involves the rotation of the shutter and its vertical displacement towards the desired bearing seat. The shutter can also be removed from the cylindrical supply conduit by forcing the protuberance to go inside a vertical groove by elastic deformation of the plastic material of the shutter. This prevents the shutter from accidentally slipping out from the supply conduit, and thus the loss of the regulation set, contemporaneously allowing to voluntarily remove the shutter from the supply conduit whenever needed.

SUMMARY OF THE INVENTION

Object of the present invention is to provide an automatic feeding dispenser in which it is particularly simple to regulate the feed inside the accumulation tray.

A further object of the present invention is to provide a feeding dispenser of the aforesaid type, able to prevent poultry from coming inside the accumulation tray of the feed, especially in the first days of life and to simultaneously allow poultry to be fed throughout their growth step until the adult stage.

A further object of the present invention is to provide a feeding dispenser of the aforesaid type which allows to uniformly regulate the feed level inside all feeding dispensers present within a breeding area.

These objects are achieved according to the invention by means of a feeding dispenser characterized in claim 1. Further peculiar characteristics of the present invention are set forth in the respective dependent claims.

In general, an automatic feeding dispenser for poultry breeding comprises a cylindrical feed supply conduit, an accumulation tray to supply the feed to poultry and an outer sliding and rotatable shutter with respect to the supply conduit. The accumulation tray has a circular shape and comprises a bottom wall and a side wall. In most of the embodiments, the shutter comprises a cylindrical portion and a truncated-cone shaped portion with the opening of the cone facing the accumulation tray.

The cylindrical portion of the shutter and the cylindrical supply conduit are coupled and free to slide between one another by means of a protuberance engaged in a groove. The groove is configured to provide an upper bearing seat for the protuberance so as to obtain a positioning height along the cylindrical supply conduit other than that of the lower minimum positioning height of the shutter.

The groove is shaped to provide two bearing seats at different heights, i.e. an upper height and a lower height, inside the feeding dispenser according to the present invention. The upper bearing seat of the two bearing seats is defined by a bump that can be surmounted by the protuberance by elastic deformation of part of the cylindrical supply conduit and/or part of the cylindrical portion of the shutter following an upward or downward thrust exerted on the shutter with force sufficient to exceed the elastic reaction of part of the cylindrical supply conduit and/or part of the cylindrical portion of the shutter.

This offers the possibility to easily carry out the regulation maneuver between the two feeding positions, without requiring an operator to bend down.

In fact, in the first days of life of poultry, the shutter is positioned with the protuberance inside the upper seat of the groove, i.e. with the shutter in the highest position of the two positions. In this position, the feed level inside the feeding dispenser is very high and allows the chicks to easily feed themselves while simultaneously preventing the chicks from coming inside the feeding dispenser and from contaminating the feed. After a few days, the poultry grow in sizes and weight sufficiently to reach the adult stage. The shutter of the feeding dispenser must be displaced towards the lowest position of the two regulation positions to leave a more reduced level of feed and which anyhow allows the poultry to access the feed.

It is thus clear that an operator can bring the shutter from the upper position (suitable for the chicks) to the lower position (suitable for adult poultry) by exerting a simple downward thrust on the shutter, for example by using a stick, with force sufficient to allow the protuberance to surmount the bump defining the upper bearing seat, i.e. without also having to carry out the rotation of the shutter.

A device is thus obtained this way which, with only one change of the feed level throughout the development cycle, offers the animal the possibility to comfortably feed itself throughout the cycle and to simultaneously reduce and simplify the time required for these regulations.

In fact, by coupling the cylindrical feed conduit with the shutter along an appropriate path, the protuberance can easily switch from a higher bearing seat to a lower bearing seat, and vice-versa, with extreme ease.

In practice, two feed levels, which ensure good dosing and thus a correct growth of the animal from the beginning to the end of its breeding cycle, can be obtained with only two cone-regulator positions.

Normally, the truncated-cone shaped portion of the shutter (or "dosing cone") is positioned with the protuberance resting inside the upper seat before the start of the breeding cycle, with no breeding, when it is comfortable for the operator since he has a more comfortable position by lifting the entire line of feeding dispensers to his arms' level, and contemporaneously to do other works on the feeding dispensers (cleaning, etc.).

During the growth of the animal, when the feeding dispensers are positioned below, at a height suitable for a chicken and thus more uncomfortable to regulate, it is sufficient to push the dosing cone in the lower position, an operation which is done by walking, almost without stopping, with a pushing stick.

The rapidity in being able to simply do it by making the protuberance surmount the bump, and the fact that throughout the cycle this operation is only done once, makes the feeding dispenser as practical as the ones with the centralized regulation. Moreover, the regulation of the level is punctual, more accurate, leading to advantages for the animals in terms of growth uniformity.

In an embodiment of the present invention, the groove is made on the outer surface of the cylindrical supply conduit, whereas the protuberance radially projects towards the inside of the cylindrical portion of the shutter.

In another embodiment, the groove is made on the inner surface of the cylindrical portion of the shutter, whereas the protuberance radially projects outwardly from the cylindrical supply conduit.

In an embodiment of the present invention, the groove can be shaped to provide an inverted hook-shaped path in which the protuberance integral with the shutter can slide. The groove comprises two branches and the two bearing seats can be arranged on a same branch of the inverted hook-shaped path.

In any case, the lower free edge of the truncated-cone shaped portion of the shutter is always at a lower height with respect to the upper free edge of the side wall of the accumulation tray in any of the positions assumed by the shutter at the two different heights, i.e. at the upper height and at the lower height.

In practice, the height of the edge of the accumulation tray was particularly studied to allow to easily feed the animal already in its first days of life and to maintain it valid until the last day of the breeding cycle. This way, the feed level is optimized in the first days of life, by setting the shutter at a first of the two heights, to bring the feed at a sufficiently high level, so that the chick can also eat from his first day of life by leaning with its beak beyond the edge of the accumulation tray. With the shutter at a second of the two heights, the feed is maintained at a sufficiently lower level to allow the adult animal to feed itself, but to prevent the animal from being able to waste the feed, thus making the level suitable throughout the rest of the breeding cycle.

When the shutter is in its position of maximum elevation, i.e. the one suitable for feeding the chicks, the shape of the shutter allows the feeding dispenser to have a "free" surface for the accumulation of the feed. The presence of the feed distributed on the free surface is insufficient for a possible stationing of the chick inside the feeding dispenser, thus the animal is discouraged both from attempting to station on the edge of accumulation tray and from attempting to jump inside the feeding dispenser itself.

The term "free space or free surface" is used in the context of the present invention to denote a "circular crown" of free space between the outer wall of the shutter and the inner wall of the accumulation tray. In particular, such terms refer to the space left free by the shutter for the accumulation of the feed inside the tray of the feeding dispenser. The extension of such space varies depending on the vertical position of the shutter.

Instead, when the shutter is in its lower position, i.e. the one suitable for feeding adult poultry, the end section of the shutter provides a correct amount of feed and leaves a sufficient space to allow poultry to access the feed, but does not concede excess space, which could lead the animal to shake its head inside such space, thus dispersing the feed outside it.

In an embodiment, the cylindrical feed supply conduit includes, on its outer surface, at least one element indicating the height at which the shutter is located. This allows to easily check the correct position of the shutter.

In an embodiment, means can be provided for lifting the shutter to a height predetermined and independent of the two upper and lower heights, when the accumulation tray is resting on the ground.

The feeding dispenser is equipped with a feed diffuser coaxial to the shutter and arranged at the center of the accumulation tray. The feed diffuser has at least one substantially conical or truncated-cone shaped portion suitable for cooperating with the truncated-cone shaped portion of the shutter to distribute the feed inside the accumulation tray. The means for lifting the shutter can be constituted for example by at least one pushing member comprising a shaft coaxial to the diffuser and freely sliding with respect to it, a supporting base on the ground and arranged outside of the accumulation tray at an end of the shaft and a plurality of fins on the opposite end and that can be in abutment against the shutter inside its truncated-cone shaped portion.

Moreover, as is known, the feeding dispenser is connected to a main suppling tube by means of a fitting. In the feeding dispenser according to the invention, a choking member rotatable with respect to the fitting can be provided, to obstruct, completely or in part, an outlet opening towards the feed supply conduit. This allows to reduce or fully exclude the flow of feed towards the feeding dispenser, for example in case some feeding dispensers are deactivated to prevalently channel the feed towards other feeding dispensers.

Anyhow, further means can be provided for contemporaneously regulating, with continuity and in a centralized way, the position of the shutter of all feeding dispensers at independent heights with respect to the two different heights, respectively upper and lower, and to the height predetermined for the tray resting on the ground.

A feeding dispenser made according to the present invention has different advantages, among which:
- extremely easy access to the feeding dispenser, from the first day of life;
- impossibility for the chicks to come into the accumulation tray, since the space between the shutter and the free edge of the tray is occupied by the feed;
- extremely short times for filling the feeding dispensers;
- uniform distribution of the feed inside the accumulation tray, also with the feeding dispenser in raised position;
- the animals are stimulated to eat more often, since the exchange of feed inside the accumulation tray is particularly frequent;
- the feeding dispenser consists of a very reduced number of components which makes its production economic and simple, and its cleaning is facilitated by the lack of components with complex shapes, such as grids or similar, which should be removed and repositioned to be able to carry out the cleaning of the feeding dispensers; and
- easy to size for use in breeding in different types of environments, such as in warehouses and cages, allowing poultry to better access the feed and greater space with respect to the known feeding dispensers.

BRIEF DESCRIPTION OF THE DRAWINGS

Further aspects and advantages of the present invention will become clearer in the following description, made by way of example and without limitations with reference to the accompanying schematic drawings, in which.

DETAILED DESCRIPTION

Figure 1:
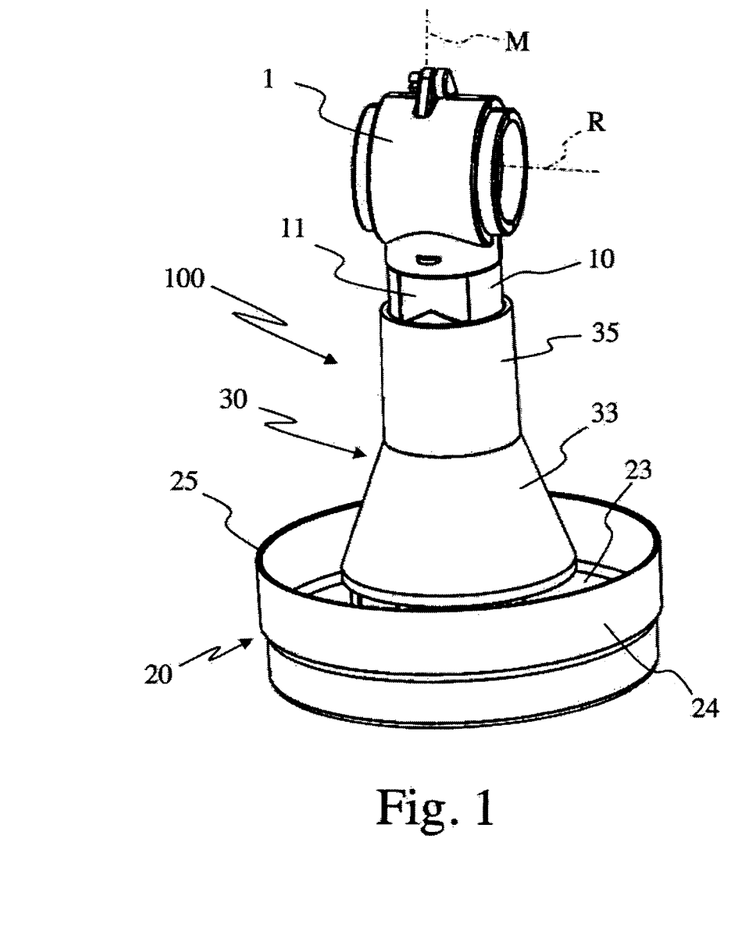
FIG. 1 is a perspective view of an embodiment of a feeding dispenser of the present invention with the shutter in a first raised position.
Figure 2:
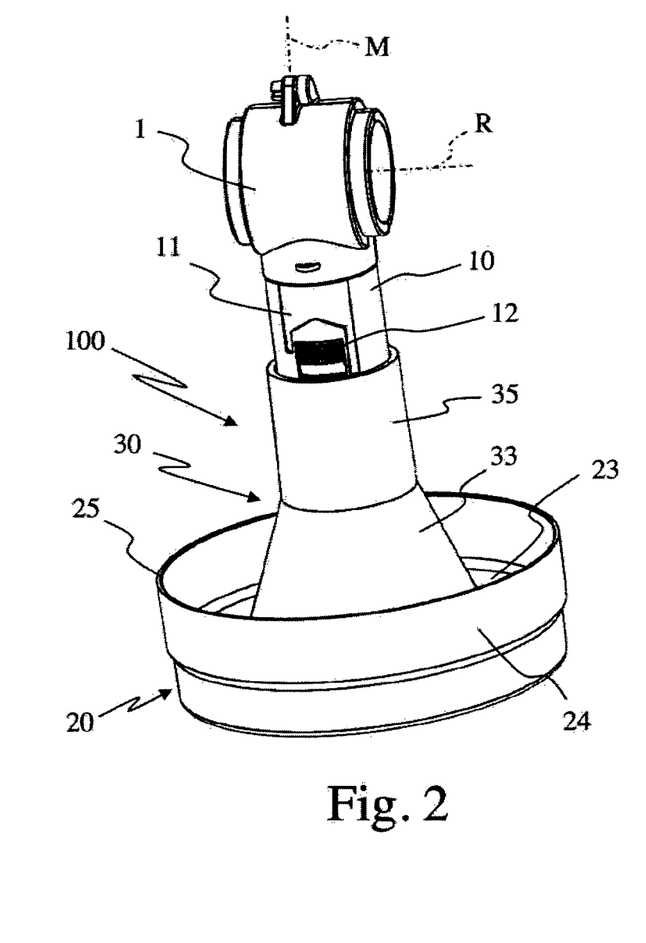
FIG. 2 is a perspective view of the feeding dispenser of FIG. 1 with the shutter in a second lowered position.

The automatic feeding dispenser 100 depicted in FIGS. 1 and 2 essentially comprises a feed supply conduit 10 coaxial to the vertical axis M of the feeding dispenser, an accumulation tray 20 to supply the feed to the poultry and at least one shutter 30 sliding outside of the supply conduit 10 in parallel to the axis M and rotatable around the same axis to regulate the level of feed accumulated inside the tray 20. The accumulation tray 20 preferably has a circular shape and comprises a bottom wall 23 and a side wall 24 with a free edge 25.

A fitting 1 of known type, which allows to connect the feeding dispenser 100 along the main supply tube (not shown) developing along an axis R, is mounted on the upper end of the conduit 10.

The shutter 30 includes a first cylindrical portion 35 slidable and rotatable with respect to the supply conduit 10 and a truncated-cone shaped portion 33.

In the view of FIG. 1, the shutter 30 is in a raised position with respect to the accumulation tray 20. In this position, the feed level inside the accumulation tray 20 reaches the free edge 25, thus allowing the chicks to feed themselves from the first day of the growth step.

In the view of FIG. 2, the shutter 30 is in a lowered position with respect to the accumulation tray 20. In this position, the feed level stays lower than the free edge 25 of the side wall 24 of the accumulation tray 20, thus allowing the poultry to access the feed throughout the successive growth steps of the poultry until the adult condition.

Figure 3:
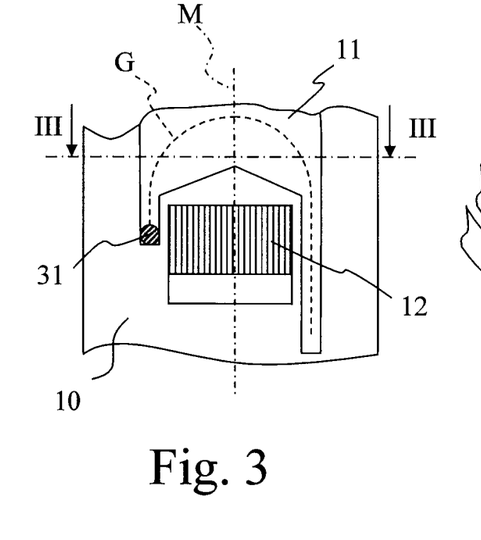
FIG. 3 is a front view of a detail of the feeding dispenser of FIG. 1, in which the portion of the shutter was removed for more clarity.
Figure 3A:
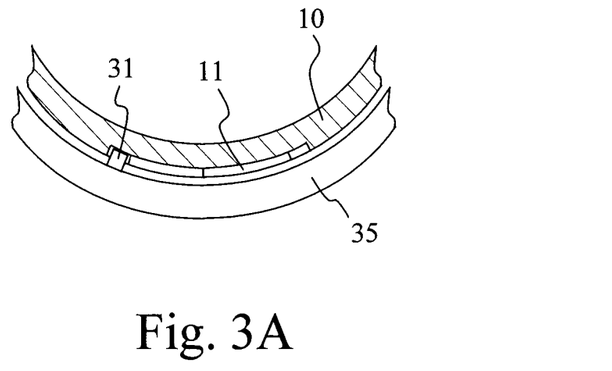
FIG. 3A is a sectional view according to the plane of FIG. 3, in which a portion of the shutter is also shown.
Figure 4:
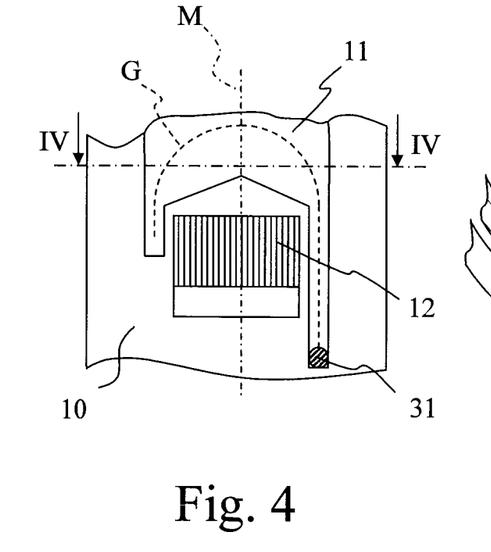
FIG. 4 is a front view of a detail of the feeding dispenser of FIG. 2, in which the portion of the shutter was removed for more clarity.
Figure 4A:
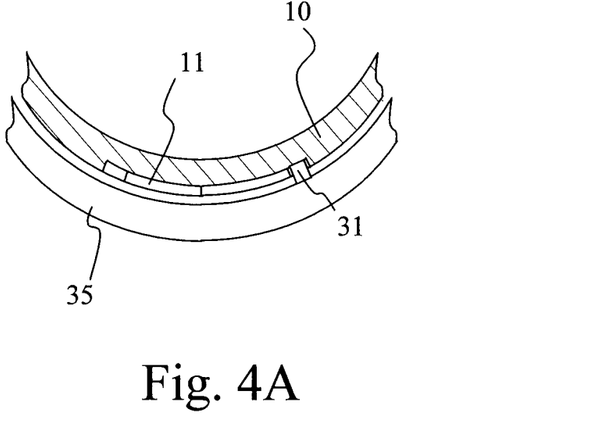
FIG. 4A is a sectional view according to the plane IV-IV of FIG. 4, in which a portion of the shutter is also shown.

The views of FIGS. 3 and 4 schematically show a portion of the cylindrical supply conduit 10 which highlights the groove 11, also partially shown in FIGS. 1 and 2, in which a protuberance 31 slides integral with the cylindrical portion 35 (not shown for clarity) of the shutter 30. The cylindrical portion 35 of the shutter 30 is instead shown in the sectional view of FIG. 3A, taken with respect to the plane III-III of FIG. 3, as well as in the sectional view of FIG. 4A, taken with respect to the plane IV-IV of FIG. 4.

The groove 11 is shaped to provide an inverted hook-shaped path, denoted by the dotted line G, to the protuberance 31. Two bearing seats for the protuberance 31 are arranged at the ends of the inverted hook-shaped path G. For example, in the condition of FIG. 3, the protuberance 31 is in the bearing seat corresponding to the highest height of the shutter 30, like the one shown in FIG. 1. For example, in the condition of FIG. 4, the protuberance 31 is in the other bearing seat corresponding to the lowest height of the shutter 30, like the one shown for example in FIG. 2.

In practice, the shutter 30 can simply be translated vertically and rotated to switch from one position to the other. An operator can use for example a stick with an appropriate hook at the end to impart these simple translation and rotation movements to the shutter 30 without necessarily having to bend down.

The views of FIGS. 3 and 4 further show an element 12 indicating the height at which the shutter 30 is located, so that to provide the correct position of the shutter 30 to the operators at a glance. In fact, as can be noted in FIGS. 1 and 2, the indicator element 12 present on the outer surface of the supply conduit 10 is concealed when the shutter 30 is at the upper height (FIG. 1), whereas it is clearly visible when the shutter 30 is at the lower height (FIG. 2).

Figure 5:
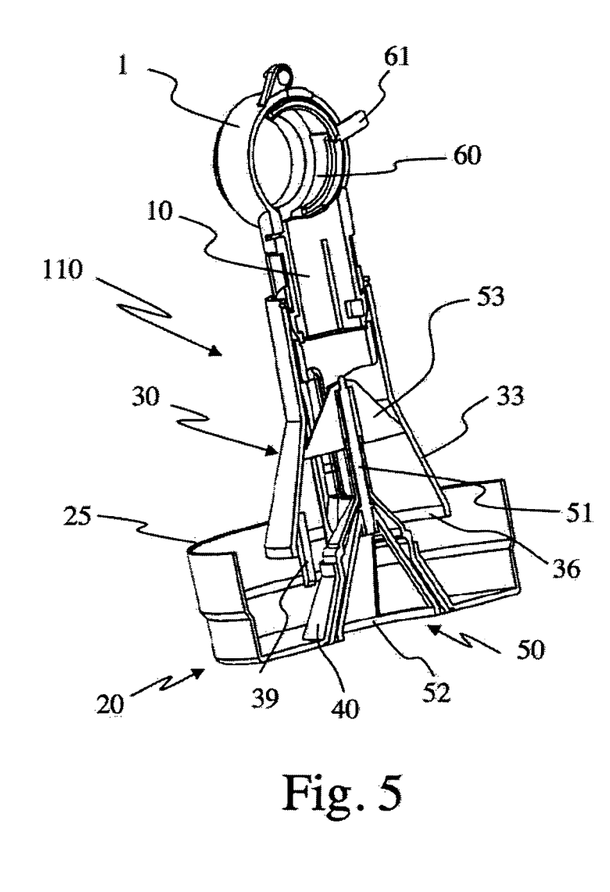
FIG. 5 is a sectional axial view of a further embodiment of a feeding dispenser with the shutter in the same position as that of the feeding dispenser of FIG. 1.
Figure 6:
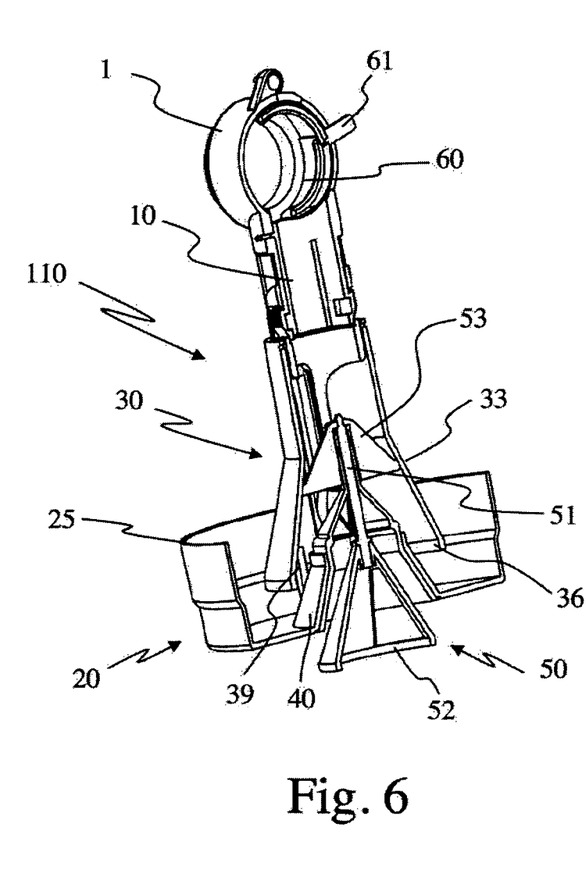
FIG. 6 is a sectional axial view of the feeding dispenser of FIG. 5 with the shutter in the same position as that of the feeding dispenser of FIG. 2.

FIGS. 5 and 6 show a further embodiment of a feeding dispenser 110 in which means are provided for lifting the shutter 30 to a predetermined height when the accumulation tray 20 is resting on the ground. The height reached by the shutter 20, depicted in FIG. 5, is independent of the different heights that are achieved in the two positions shown in FIGS. 1 and 2.

A feed diffuser 40 coaxial to the shutter 30 is arranged in the center of the accumulation tray 20. The feed diffuser 40 comprises at least one substantially conical or truncated-cone shaped portion cooperating with the truncated-cone shaped portion 33 of the shutter 30 to distribute the feed inside the accumulation tray 20.

The means for lifting the shutter 30 are constituted for example by a pushing member 50 which comprises a shaft 51 coaxial to the diffuser 40 and freely sliding with respect to it, a supporting base 52 on the ground and arranged outside of the accumulation tray 20 at one end of the shaft 51. Fins 53, which go to abut against the shutter 30 inside its truncated-cone shaped portion 33, are arranged at the opposite end of the shaft 51.

FIG. 5 shows the position of maximum elevation of the shutter 30, practically corresponding to the position the shutter 30 assumes when the accumulation tray 20 is resting on the ground or at the bottom of a cage. In FIG. 6, the accumulation tray 20 is raised with respect to the ground and the position of the shutter 30 can be determined by other regulating means, for example the same means described up to now with reference to FIGS. 1 to 4. As highlighted in FIGS. 5 and 6, the shutter 30 is provided with spacer columns 39 which rest on the bottom wall of the accumulation tray 20 when the shutter 30 is in the position shown in FIG. 6, i.e. at the lower minimum positioning height of the shutter 30. The spacer columns 39, although not clear in all embodiments described and shown, are anyhow elements shared with all embodiments of a feeding dispenser according to the present invention.

It is important to note that in all of the embodiments of the feeding dispenser according to the present invention, the lower free edge 36 of the truncated-cone shaped portion 33 of the shutter 30 is always at a lower height with respect to the upper free edge 25 of the side wall 24 of the accumulation tray 20 in any of the positions assumed by the shutter 30. This way, a free space sufficient to allow the feeding of the chicks, simultaneously preventing the chicks from coming inside the accumulation tray 20, is left also in the position of maximum elevation of the shutter 30, i.e. the one suitable for ensuring a feed level also for the first days of life of the poultry (i.e. chicks). In practice, when the shutter 30 is in the position of maximum elevation, the space available to the chicks is limited to sizes incompatible with their stationing inside the accumulation tray 20 of the feed. The feed level is between the free edge 36 of the shutter 30 and the free edge 25 of the accumulation tray 20, making it difficult for the chicks to come and station inside the accumulation tray 20. In other words, the position of the feed achieved in this condition discourages the animal from attempting to jump inside the tray 20.

In the embodiment of FIGS. 5 and 6, a choke member 60 incorporated in the fitting 1 connecting the feeding dispenser to the main supplying tube (not shown) is also shown. The choke member 60 is rotatable with respect to the fitting 1, by acting on an outer lever 61, to obstruct, completely or in part, the outlet opening towards the feed supply conduit 10.

Figure 7:
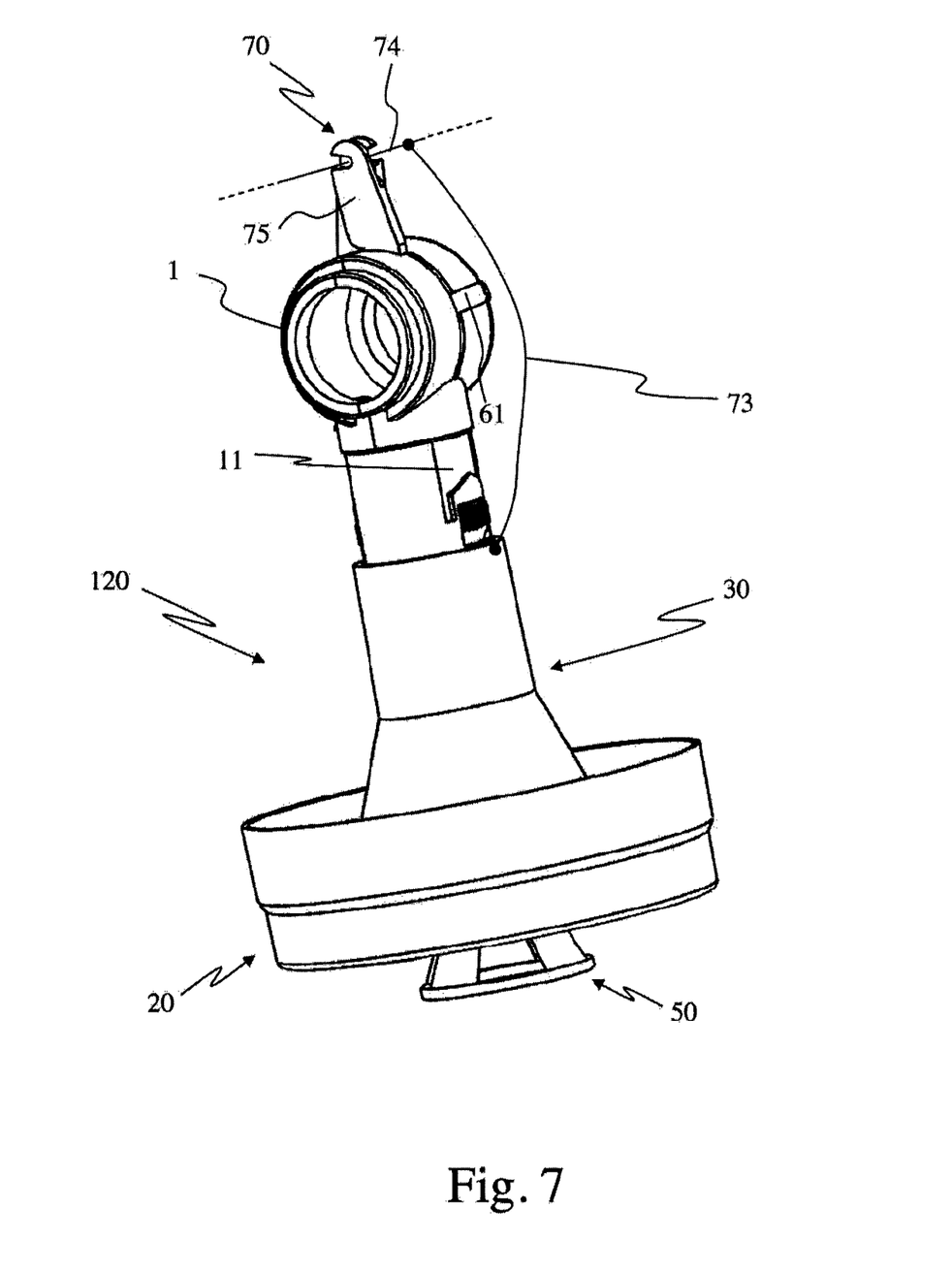
FIG. 7 is a perspective view of a further embodiment of a feeding dispenser of the present invention with the shutter in the same lowered position as that of FIGS. 2 and 6.

FIG. 7 shows a further embodiment of a feeding dispenser 120 which can include further means 70 for regulating the feed level independently of those described up to now. For example, as schematically shown in the figure, the shutter 30 can be connected by means of a string 73 to a main cable 74.

All the feeding dispensers supplied by a same main supplying tube are connected to the main cable 74 which slides in appropriate supports 75 integral with the fitting 1 of each feeding dispenser, to carry out the contemporaneous regulation of the height of the shutters of all feeding dispensers connected to the same main supplying tube.

Figure 8:
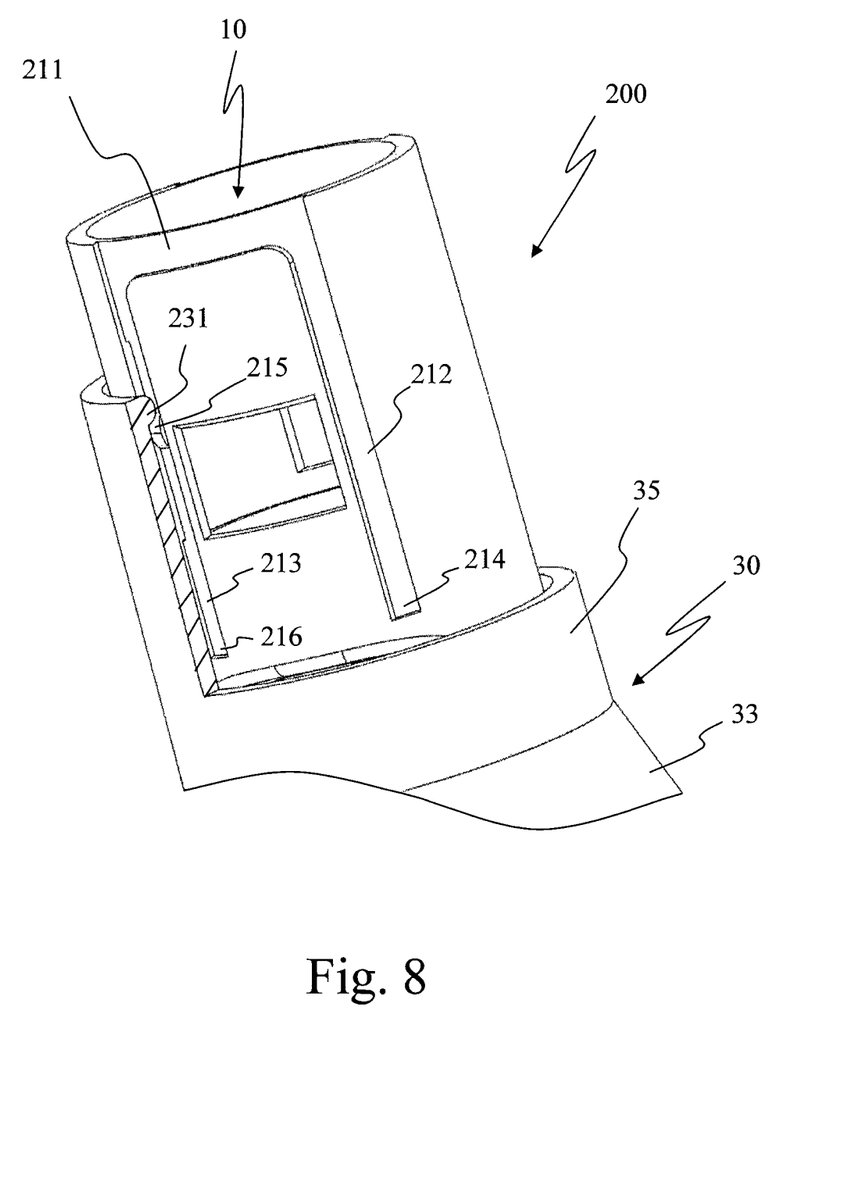
FIG. 8 shows a detail of a further embodiment of a feeding dispenser according to the present invention.

FIG. 8 shows a detail of a further embodiment of a feeding dispenser 200 according to the present invention, in which the groove 211 includes two branches 212 and 213. The branch 212 provides a single bearing seat 214 arranged at the lower end of the groove, for a protuberance 231 projecting from the cylindrical portion 35 of the shutter 30. Instead, the branch 213 includes a bump 215 to provide an upper bearing seat to the protuberance 231, whereas a lower bearing seat 216 is arranged at the lower end of the branch 213.

Figure 9:
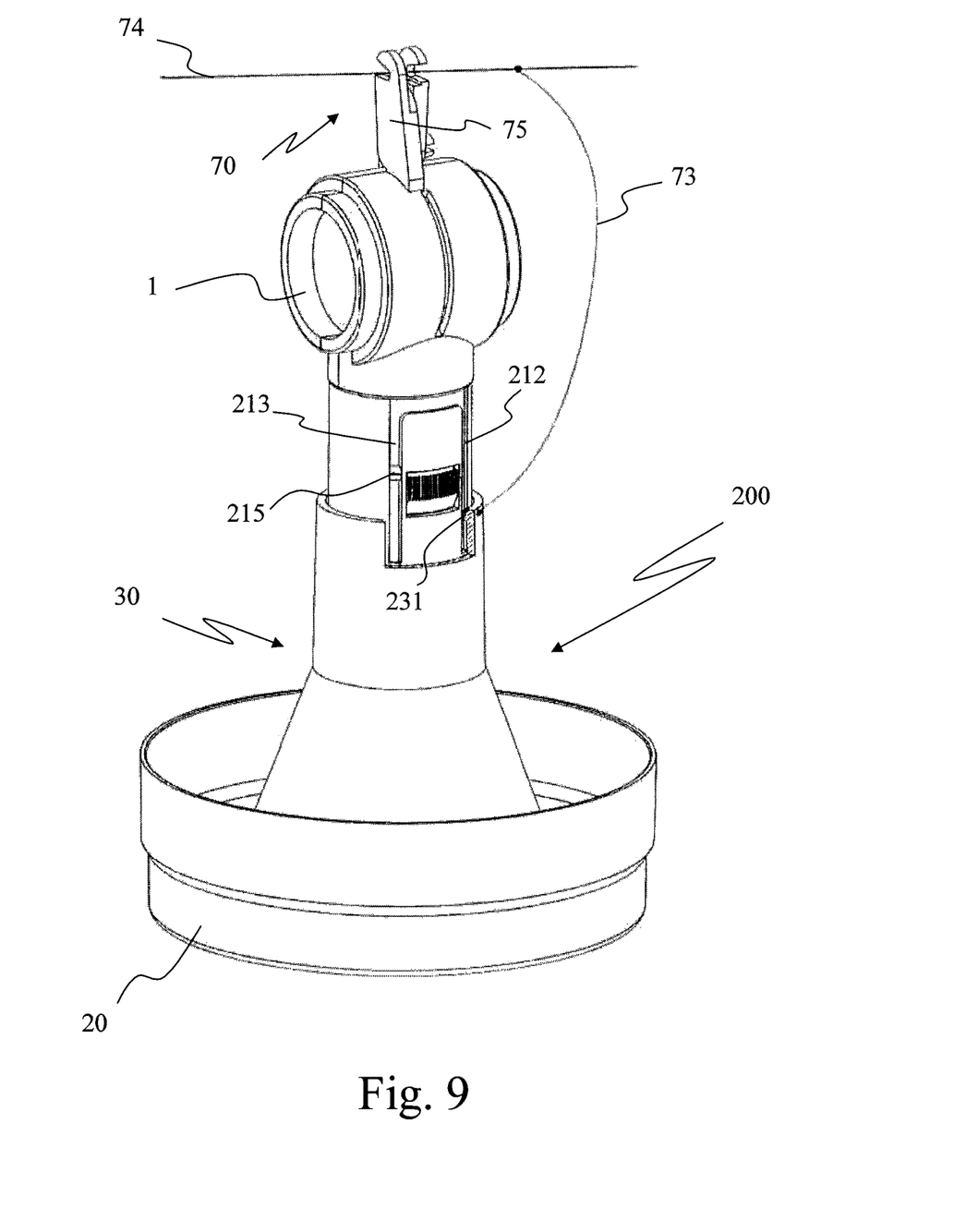
FIGS. 9, 10, 11 and 12 show a feeding dispenser according to the embodiment of FIG. 8, with the shutter in the different feed regulation positions.
Figure 10:
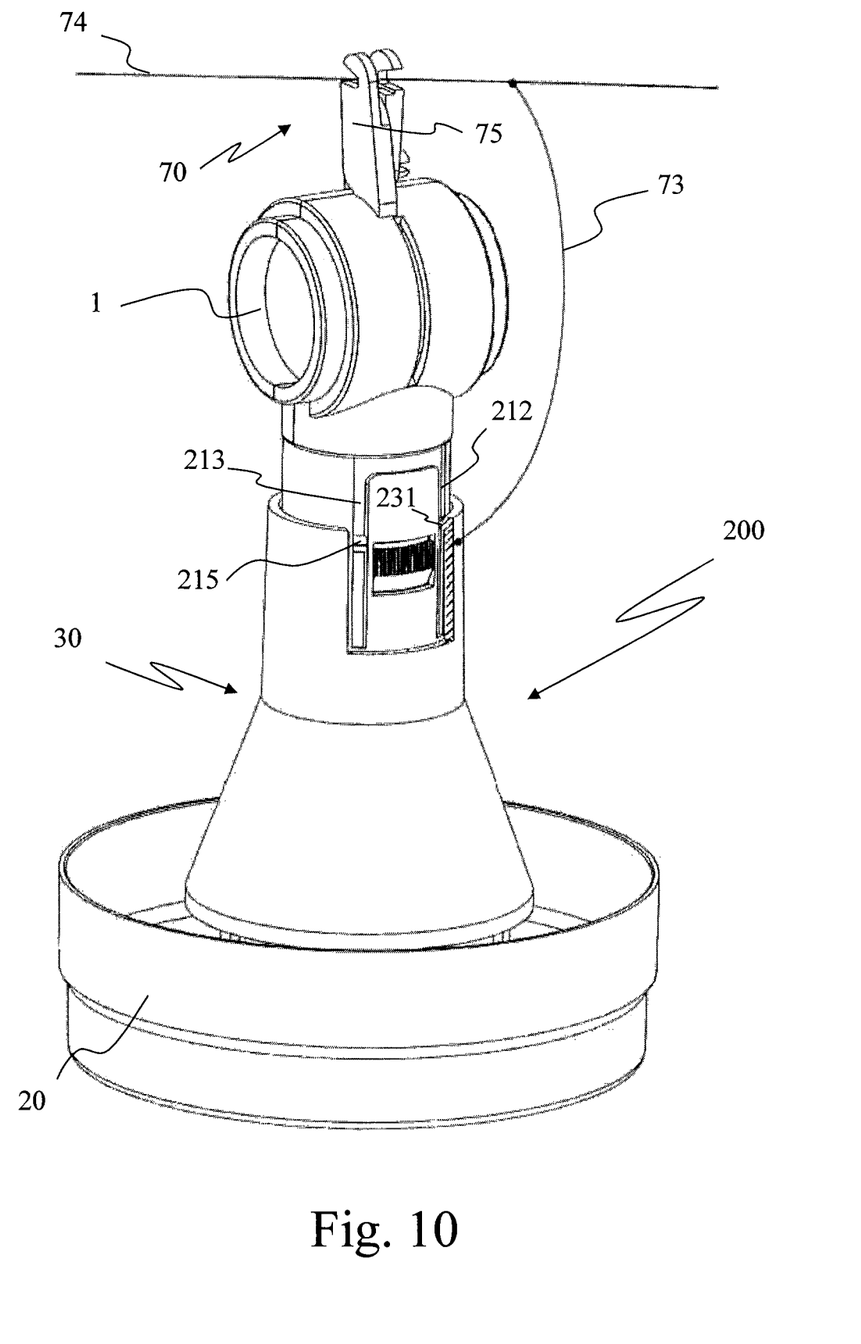

In the view of FIG. 9, in which the shutter is in one of the lower positions, the protuberance 231 is engaged in the branch 212 of the groove 211 and the position of the shutter 30 can be changed for example through the centralized regulation system, like the one shown in FIG. 7, controlled through the main cable 74. In the view of FIG. 10, in which the protuberance is always engaged in the branch 212 of the groove 211, the shutter 30 is shown in one of the upper positions of regulation, in this case also set through the cable 74 of the centralized regulation system.

Figure 11:
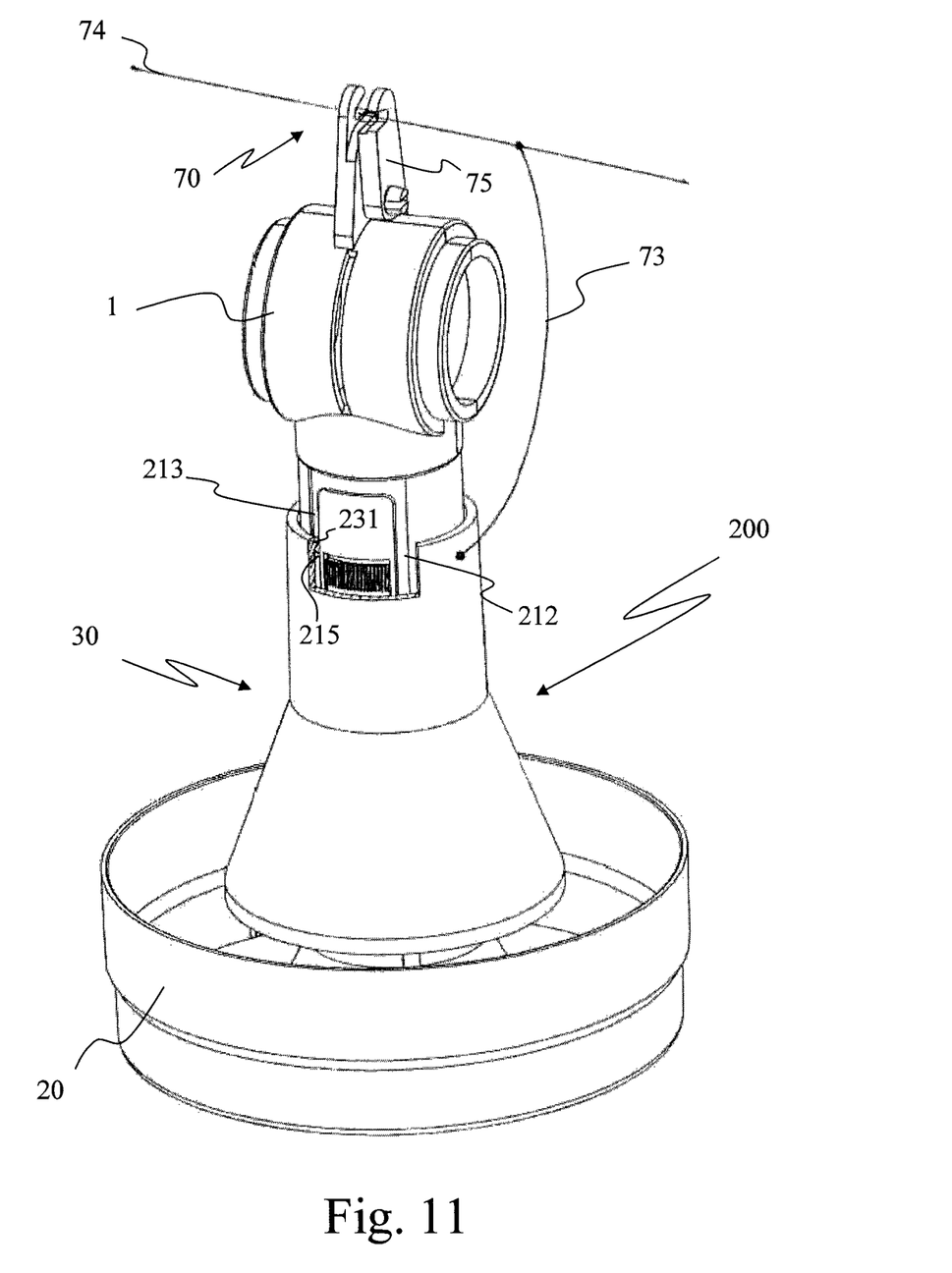
Figure 12:
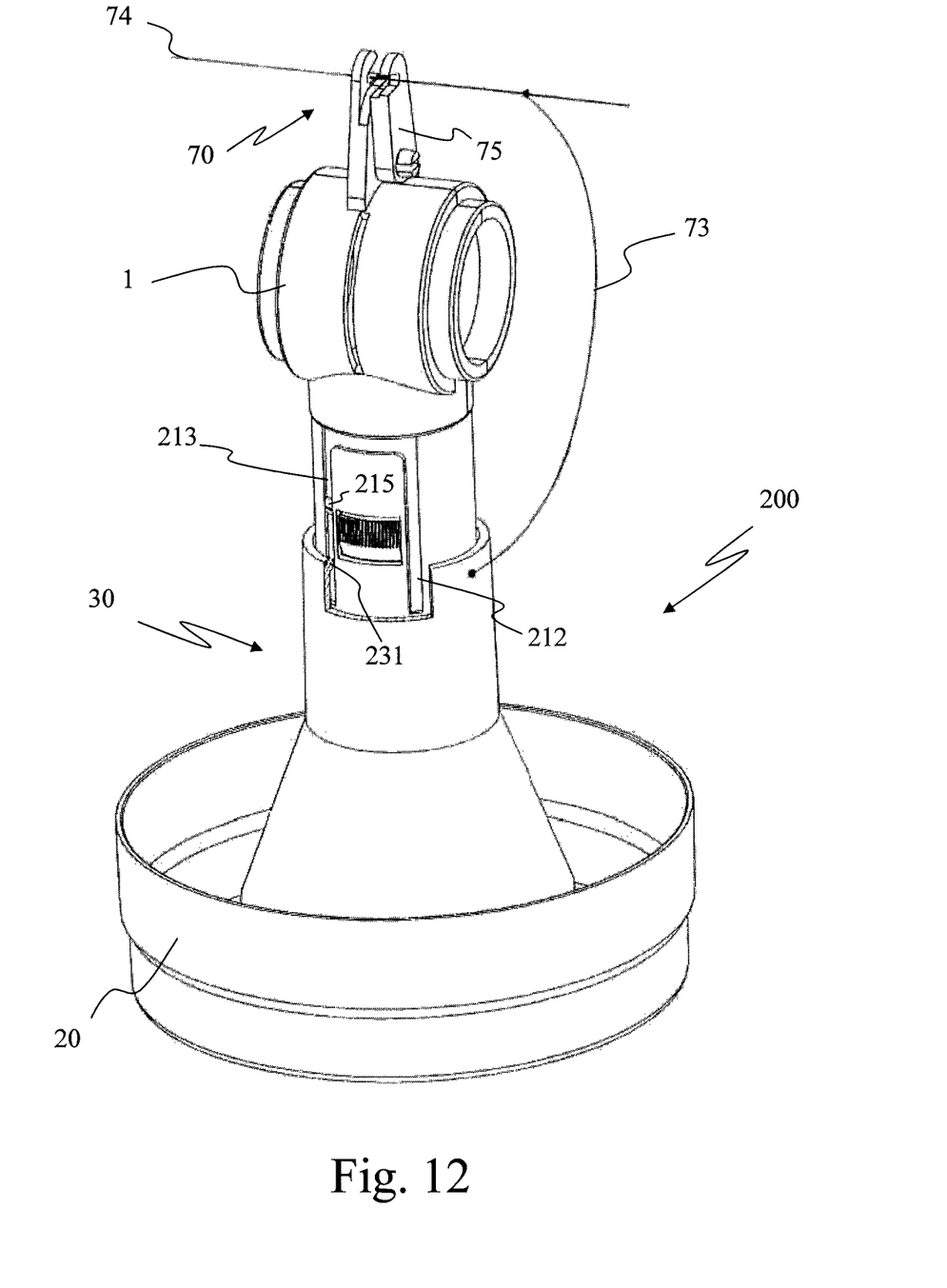

In the view of FIG. 11, the protuberance 231 is engaged in the branch 213 of the groove 211 and is resting on the bump 215 to maintain the shutter 30 in a predetermined higher position. The position of the shutter 30 can be changed by pushing the shutter downward so that, due to the elastic deformation of the plastic materials composing the supply conduit 10 and the shutter 30, or the elastic deformation of at least part thereof, the protuberance 231 is able to surmount the bump 215, as shown in FIG. 12.

In the embodiment of FIGS. 8 to 12, it is thus possible to have a feeding dispenser with at least three regulation systems, i.e.:

collective regulation of all the feeding dispensers by means of the centralized system activated through the main cable 74 when the protuberance 231 of the shutter is in the branch 212; or manual, but quick, regulation with a stick, possibly provided with a hook, to lift the shutter 30 upwards or to push it downwards without a need for the operator to bend his back; or semiautomatic regulation, by engaging the protuberance 231 in the branch 213 provided with the bump 215, with the shutter 30 connected to the main cable 74. This way, the lifting of the shutter 30 can be carried out by acting through the main cable 74 of the centralized system and the lowering can be carried out manually and quickly with the stick used as a pusher by the operator walking, without stopping.

In this case, it is possible to eliminate the most serious problem of centralized regulation, due for example to being put out of tune by the elongation of the main cable 74 or by the loosening of the strings 73, which never allow an equal regulation of the feed level in all the feeding dispensers. Moreover, a very quick and much more precise regulation of the upper lever is achieved because it is made collectively by the main cable 74, by abundantly lifting all the shutters beyond the bump 215 to then let them fall down again, with the protuberance resting on the bump 215. At the same time, a manual regulation of the lower level is achieved, but simultaneously quickly, almost like the collective one, because it carried out by an operator walking along the feeding dispensers and acting with a stick-like pusher.

Several modifications can be made to the embodiments of the present invention so far depicted for illustration purpose only. For example, in all of the embodiments shown herein, the groove is made on the outer surface of the cylindrical supply conduit, and the protuberance radially projects towards the inside of the cylindrical portion of the shutter, but it is also possible to make the groove on the inner surface of the cylindrical portion of the shutter with the protuberance radially projecting outwardly from the cylindrical supply conduit.

The invention claimed is:

1. A feeding dispenser for poultry breeding, comprising a cylindrical feed supply conduit, an accumulation tray to supply the feed to poultry, wherein the accumulation tray has a circular shape and comprises a bottom wall and a side wall, and an outer sliding shutter rotatable with respect to said supply conduit and slidingly movable in vertical direction between an upper positioning height and a lower positioning height to regulate the feed level in said accumulation tray, wherein the shutter comprises a cylindrical portion and a truncated-cone shaped portion with the opening of the cone facing the accumulation tray, wherein the cylindrical portion of said shutter and said cylindrical supply conduit are coupled and free to slide between one another through a protuberance engaged in a groove, wherein the groove is configured and shaped as an inverted hook having two straight vertical branches which are parallel to the axis of the feeding dispenser, wherein a bump is provided in one of said two straight vertical branches to provide an upper bearing seat for said protuberance and define a relevant upper positioning height of the shutter, wherein said bump can be surmounted by said protuberance by elastic deformation of part of said cylindrical supply conduit and/or part of said cylindrical portion of the shutter following an upward or downward thrust exerted on said shutter with force sufficient to exceed the elastic reaction of part of said cylindrical supply conduit and/or part of said cylindrical portion of the shutter, so as to move said shutter between said upper positioning height, a lower bearing seat for said protuberance being provided at the end of said one of said two branches provided with said bump in order to define said lower positioning height for said shutter.

2. The feeding dispenser according to claim 1, wherein said groove is made on the outer surface of the cylindrical supply conduit, and wherein said protuberance radially projects towards the inside of the cylindrical portion of the shutter.

3. The feeding dispenser according to claim 1, wherein said groove is made on the inner surface of the cylindrical portion of said shutter, and wherein said protuberance radially projects towards the outside of said cylindrical supply conduit.

4. The feeding dispenser according to claim 1, wherein the cylindrical feed supply conduit includes, on its outer surface, at least one element indicating the height at which the shutter is located.

5. The feeding dispenser according to claim 1, wherein at least one pushing member is provided for lifting said shutter to a height predetermined and independent of said upper positioning height and said lower positioning height when the accumulation tray is resting on the ground.

6. The feeding dispenser according to claim 5, wherein a feed diffuser coaxial with respect to the shutter is arranged in the center of the accumulation tray, said feed diffuser having at least one substantially conical or truncated-cone shaped portion suitable for cooperating with the truncated-cone portion of said shutter to distribute the feed in the accumulation tray, said at least one pushing member comprising a single shaft coaxial to said diffuser and freely sliding with respect to it, a supporting base on the ground and arranged outside of the accumulation tray at an end of said single shaft, and a plurality of fins fixed on the opposite end of the single shaft and that can be in abutment against the shutter inside its truncated-cone portion.

7. The feeding dispenser according to claim 1, wherein the shutter is connected to a main cable through a string for continuously adjusting the position of said shutter at independent heights with respect to said upper positioning height and said lower positioning height for the tray resting on the ground.

8. The feeding dispenser according to claim 1, connected to a main supplying tube through a fitting, wherein one choking member rotatable with respect to the fitting is provided so as to obstruct, completely or in part, an outlet opening towards the feed supply conduit.

* * * * *